US009788247B1

(12) United States Patent
Velusamy et al.

(10) Patent No.: US 9,788,247 B1
(45) Date of Patent: Oct. 10, 2017

(54) LONG TERM EVOLUTION (LTE) COMMUNICATION SYSTEM TO TRANSFER COMMUNICATIONS FROM NON-LTE TO LTE NETWORKS (71) Applicant: Sprint Communications Company L.P., Overland Park, KS (US)

(72) Inventors: Saravana Velusamy, Olathe, KS (US); Rajil Malhotra, Olathe, KS (US); Daniel J. Pope, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 66 days.

(21) Appl. No.: 14/657,116

(22) Filed: Mar. 13, 2015

(51) Int. Cl.
*H04W 4/00* (2009.01)
*H04W 36/04* (2009.01)
*H04L 29/06* (2006.01)
*H04W 60/00* (2009.01)

(52) U.S. Cl.
CPC ......... *H04W 36/04* (2013.01); *H04L 65/1016* (2013.01); *H04W 60/00* (2013.01)

(58) Field of Classification Search
CPC combination set(s) only.
See application file for complete search history.

(56) References Cited

U.S. PATENT DOCUMENTS

| 8,351,944 | B2 | 1/2013 | Lee et al. | |
|---|---|---|---|---|
| 8,559,392 | B2 | 10/2013 | Ramankutty et al. | |
| 8,781,474 | B2 | 7/2014 | Bachmann et al. | |
| 8,843,133 | B2 | 9/2014 | Chen | |
| 9,173,084 | B1* | 10/2015 | Foskett | H04W 36/0022 |
| 2010/0091653 | A1* | 4/2010 | Koodli | H04W 36/0027 370/235 |
| 2011/0096750 | A1* | 4/2011 | Velandy | H04W 48/17 370/331 |
| 2011/0182268 | A1 | 7/2011 | Akhtar | |
| 2011/0188379 | A1* | 8/2011 | Calippe | H04L 41/12 370/241.1 |
| 2011/0188403 | A1* | 8/2011 | Calippe | H04W 24/08 370/254 |

(Continued)

FOREIGN PATENT DOCUMENTS

| CN | 102769882 | 11/2012 |
|---|---|---|
| CN | 103650582 | 3/2014 |
| WO | 2012082515 | 6/2012 |

*Primary Examiner* — Bob Phunkulh (57) ABSTRACT

In a Long Term Evolution (LTE) network, an LTE gateway system exchanges registration data with User Equipment (UE) over a non-LTE network. The LTE gateway system transfers networking data to an LTE control system responsive to an IMS media session for the UE, and transfers an instruction to remove the networking data from the LTE control system responsive to termination of the IMS media session. The LTE control system receives an LTE initial access message and if the networking data characterizes the IMS media session over the non-LTE network through the LTE gateway system, then transfers a session transfer message to the LTE gateway system to switch communication access from the non-LTE network to the LTE network. The LTE control system receives an LTE session termination message and responsively transfers an LTE reattach message to the LTE gateway system to force the UE to reattach to the LTE network.

20 Claims, 7 Drawing Sheets

(56) References Cited

U.S. PATENT DOCUMENTS

| | | | |
|---|---|---|---|
| 2011/0188457 A1* | 8/2011 | Shu | H04W 28/24 370/329 |
| 2011/0216743 A1* | 9/2011 | Bachmann | H04L 63/164 370/331 |
| 2012/0023189 A1* | 1/2012 | Giaretta | H04W 48/18 709/217 |
| 2012/0051275 A1* | 3/2012 | Alex | H04W 36/0055 370/312 |
| 2012/0054809 A1* | 3/2012 | Chowdhury | H04N 21/2223 725/93 |
| 2012/0063464 A1* | 3/2012 | Mehta | H04W 28/02 370/401 |
| 2012/0077500 A1 | 3/2012 | Shaheen | |
| 2012/0093167 A1* | 4/2012 | Velandy | H04W 76/00 370/401 |
| 2012/0166618 A1* | 6/2012 | Dahod | H04L 47/20 709/224 |
| 2012/0170548 A1* | 7/2012 | Rajagopalan | H04W 36/22 370/331 |
| 2013/0091526 A1* | 4/2013 | Iyer | H04L 65/608 725/62 |
| 2013/0097329 A1* | 4/2013 | Alex | H04L 61/2567 709/228 |
| 2013/0114408 A1* | 5/2013 | Sastry | H04W 28/02 370/231 |
| 2013/0144906 A1* | 6/2013 | Bhupalam | H04L 65/4084 707/771 |
| 2013/0144979 A1* | 6/2013 | Kansal | H04N 21/23106 709/219 |
| 2013/0163424 A1* | 6/2013 | Goerke | H04W 8/02 370/235 |
| 2013/0163434 A1* | 6/2013 | Hamel | H04W 60/06 370/237 |
| 2013/0163463 A1* | 6/2013 | Grayson | H04L 43/0876 370/253 |
| 2013/0166690 A1* | 6/2013 | Shatzkamer | H04N 21/25891 709/219 |
| 2013/0167181 A1* | 6/2013 | Dixit | H04N 21/6131 725/95 |
| 2013/0223240 A1* | 8/2013 | Hayes | H04W 28/0231 370/252 |
| 2013/0223421 A1* | 8/2013 | Gundavelli | H04W 76/022 370/338 |
| 2013/0243075 A1* | 9/2013 | Dalela | H04L 65/80 375/240.01 |
| 2013/0250761 A1* | 9/2013 | Shatzkamer | H04L 47/20 370/235 |
| 2014/0242939 A1* | 8/2014 | Salot | H04W 4/24 455/406 |
| 2015/0109995 A1* | 4/2015 | Mathai | H04W 48/18 370/328 |
| 2016/0014828 A1* | 1/2016 | Singh | H04W 76/022 370/329 |
| 2016/0037328 A1* | 2/2016 | Raveendran | H04W 8/08 370/328 |
| 2016/0050621 A1* | 2/2016 | Enomoto | H04W 4/00 370/311 |
| 2016/0057788 A1* | 2/2016 | Sharma | H04W 76/021 370/329 |
| 2016/0135219 A1* | 5/2016 | Jain | H04W 36/00 370/329 |
| 2016/0135222 A1* | 5/2016 | Jain | H04W 74/04 370/329 |

* cited by examiner

LONG TERM EVOLUTION (LTE) COMMUNICATION SYSTEM TO TRANSFER COMMUNICATIONS FROM NON-LTE TO LTE NETWORKS

TECHNICAL BACKGROUND

Wireless communication devices communicate with wireless communication networks using wireless protocols, such as Long Term Evolution (LTE), Evolution Data Optimized (EVDO), Code Division Multiple Access (CDMA), Global System for Mobile communications (GSM), High Speed Packet Access (HSPA), Wireless Fidelity (WIFI), and the like. Wireless communication devices may be able to use multiple wireless protocols.

A dual mode communication device may communicate over a non-LTE network and an LTE network. Communication data sessions on a communication device may be transferred from one wireless network to another using a handoff (either soft or hard). In a hard handoff, the communication device breaks connection with a first wireless network before making connection with the second wireless network. In a soft handoff, the communication device makes connection with a second wireless network before breaking connection with the first wireless network.

In some areas, a non-LTE network may be unavailable. In other areas, although a non-LTE network is available, it may be heavily loaded or the wireless communication device may receive a stronger signal from an LTE network. A dual mode communication device may initially register with and communicate over the non-LTE network, but then be handed-off to an LTE network. Since an LTE network requires the communication device to register with the LTE network prior to attaching, the communication device must do a hard handoff from the non-LTE network to the LTE network. Therefore, switching a communication session from the non-LTE network to the LTE network is neither efficient nor effective.

TECHNICAL OVERVIEW

In a Long Term Evolution (LTE) communication network, an LTE gateway system exchanges LTE registration data and Internet Protocol (IP) Multimedia Subsystem (IMS) registration data with User Equipment (UE) over a non-LTE communication network. The LTE gateway system transfers networking data for the UE to an LTE control system responsive to an IMS media session for the UE. The LTE gateway system transfers an instruction to remove the networking data for the UE from the LTE control system responsive to termination of the IMS media session. The networking data characterizes the IMS media session over the non-LTE network through the LTE gateway system. The LTE control system receives an LTE initial access message for the UE. If the networking data characterizes the IMS media session over the non-LTE network through the LTE gateway system, then the LTE control system transfers a session transfer message to the LTE gateway system to switch communication access for the UE from the non-LTE communication network to the LTE communication network. The LTE control system receives an LTE session termination message for the UE. The LTE control system responsively transfers an LTE reattach message to the LTE gateway system to force the UE to reattach to the LTE communication network.

DETAILED DESCRIPTION

Figure 1:
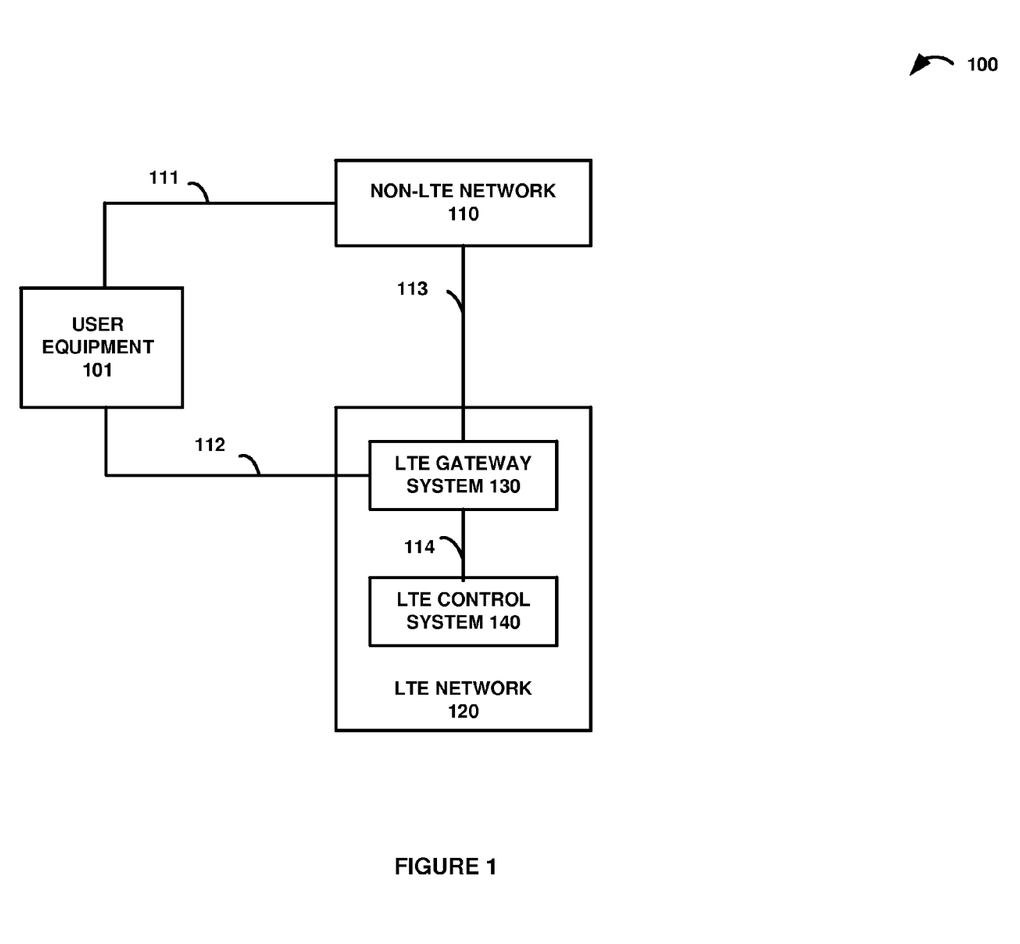
FIGS. 1-3 illustrate an LTE communication system to transfer communications from a non-LTE communication network to an LTE communication network.
Figure 2:
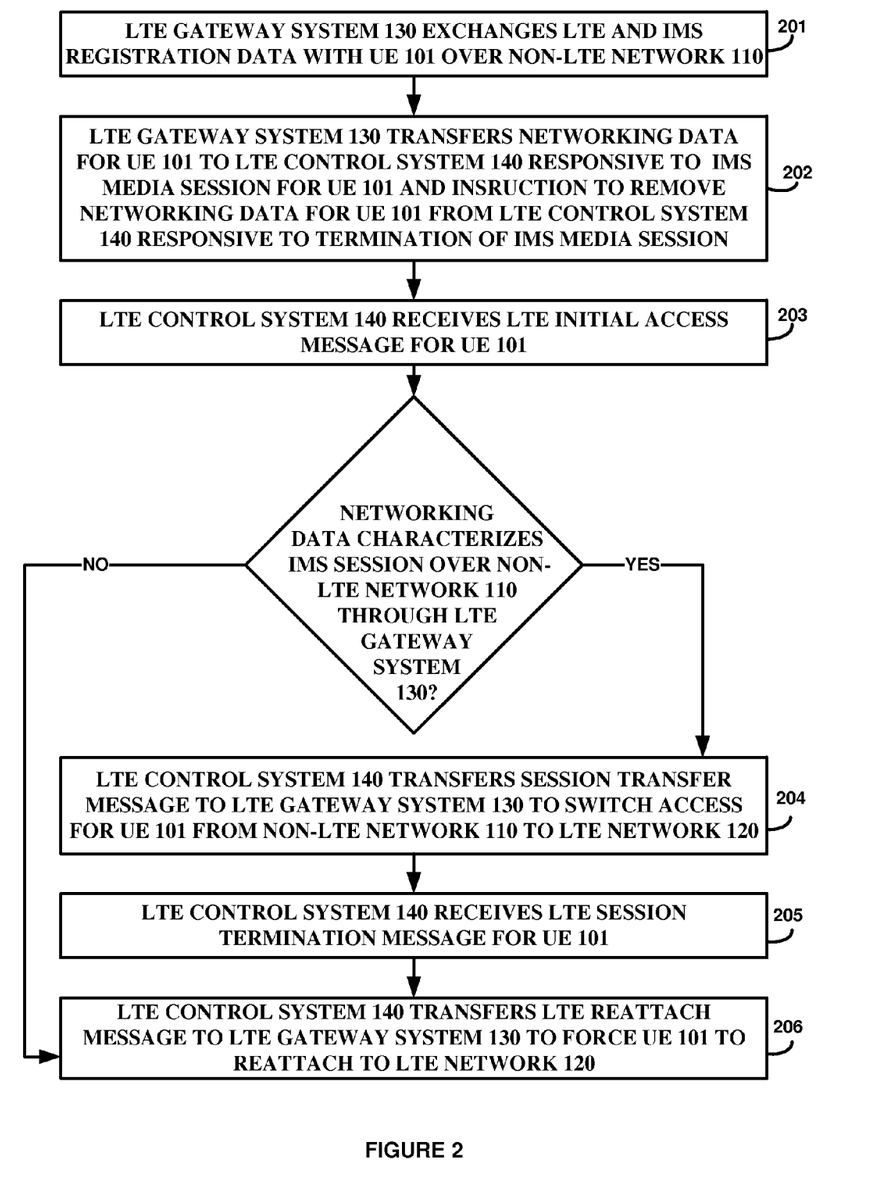
Figure 3:
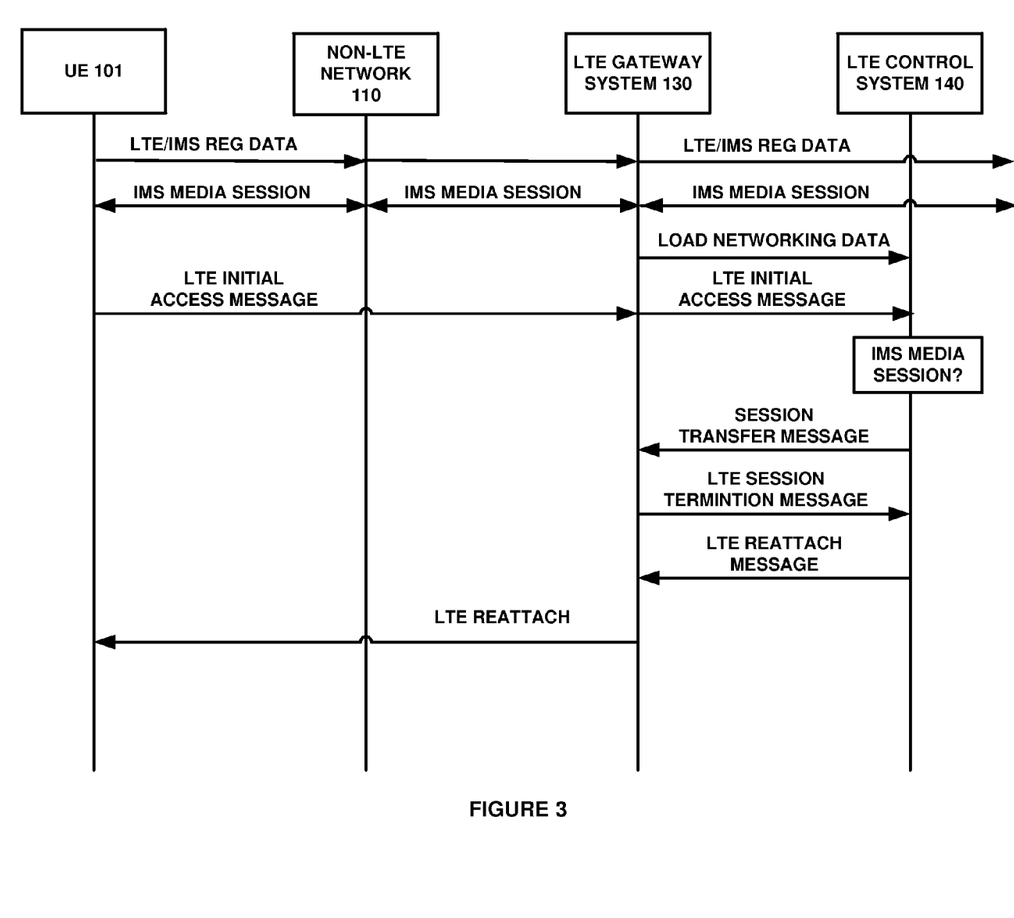

FIGS. 1-3 illustrate Long Term Evolution (LTE) communication system 100 to transfer communications from non-LTE communication network 110 to LTE network 120. Communication system 100 comprises UE 101, non-LTE communication network 110, LTE communication network 120, and links 111-114. LTE communication network 120 includes LTE gateway system 130 and LTE control system 140.

UE 101 and non-LTE communication network 110 communicate over wireless link 111. UE 101 and LTE communication network 120 communicate over wireless link 112. Non-LTE communication network 110 communicates with LTE gateway system 130 over communication link 113. LTE gateway system 130 and LTE control system 140 communicate over communication link 114.

UE 101 includes a user interface, memory device, software, processing circuitry, Radio Frequency (RF) communication circuitry, or some other communication components. UE 101 may be a telephone, computer, e-book, mobile Internet appliance, wireless network interface card, media player, game console, or some other wireless communication apparatus—including combinations thereof. UE 101 is a dual mode device capable of communicating over multiple wireless protocols, including LTE wireless networks and non-LTE wireless networks.

Examples of non-LTE network 110 include Wireless Fidelity (WIFI), Evolution Data Optimized (EVDO), Code Division Multiple Access (CDMA), Global System for Mobile communications (GSM), High Speed Packet Access (HSPA), or some other non-LTE wireless protocol.

LTE gateway system 130 comprises computers, bus interfaces, and communication ports that comprise processing circuitry and memory devices to store and execute various software modules. LTE gateway system 130 may also include other components such as a router, server, data storage system, and power supply. LTE gateway system 130 may reside in a single device or may be distributed across multiple devices. LTE gateway system 130 may comprise packet gateways of various types like a Serving Gateway (S-GW), Packet Data Network Gateway (P-GW), High Speed Packet Access Gateway (HSPA-GW), High Rate Packet Data Gateway (HRPD-GW), Evolved Packet Data Gateway (ePDG), Multimedia Broadcast Multicast Service Gateway (M-GW), Broadcast Multicast Service Center (BM-SC), and/or some other type of data packet interface into an LTE system. LTE gateway system 130 may include Policy Charging and Rules Functions (PCRFs) and On-line Charging Systems (OCSs) as well.

LTE control system 140 includes a computer, bus interface, and communication ports that have processing circuitry and memory to store and execute various software modules. LTE control system 140 may also include other components such as a router, server, data storage system, and power supply. LTE control system 140 may reside in a single device or may be distributed across multiple devices. LTE control system 140 includes control systems of various types, such as a Mobility Management Entity (MME) and a Home Subscriber System (HSS). LTE control system 140 typically includes a Domain Name System (DNS) as well.

Wireless links 111-112 communicate over air, space, or some other material that transports media. Wireless links 111-112 may use various protocols, such as Code Division Multiple Access (CDMA), Evolution Data Only (EVDO), Global System for Mobile Communication (GSM), Long Term Evolution (LTE), Wireless Fidelity (WIFI), High Speed Packet Access (HSPA), Worldwide Interoperability for Microwave Access (WIMAX), Internet Protocol (IP), or some other wireless communication formats—including combinations thereof. Wireless links 111-112 could be a direct link or may include intermediate networks, systems, or devices.

Communication links 113-114 communicate over glass, metal, wirelessly, or some other material that transports media. Communication links 113-114 may use various protocols, such as Synchronous Optical Networking (SONET), Data Over Cable Service Interface Specification (DOCSIS), Worldwide Interoperability for Microwave Access (WI-MAX), Time Division Multiplex (TDM), Ethernet, communication signaling, or some other communication format—including combinations thereof. Communication links 113-114 could be a direct link or may include intermediate networks, systems, or devices.

In a first operation, LTE gateway system 130 exchanges LTE registration data and IMS registration data with UE 101 over non-LTE communication network 110. Registration data may include International Mobile Subscriber Identifier (IMSI), Public Land Mobile Network (PLMN), Radio Access Technology (RAT) type, or other LTE and IMS registration data. Registration data may further include UE identifiers such as a Mobile Device Number (MDN), Mobile Identification Number (MIN), Uniform Resource Identifier (URI), IP address, or some other identifier—including combinations thereof.

LTE gateway system 130 transfers networking data for UE 101 to LTE control system 140 responsive to an IMS media session for UE 101. Networking data characterizes the IMS media session over non-LTE communication network 110 through LTE gateway system 130. Networking data may include a RAT type, an ePDG identifier (ID), a P-GW ID, a PCRF ID, a UE ID, or some other data that characterizes the IMS media session over the non-LTE communication network 110.

LTE gateway system 130 transfers an instruction to remove the networking data for UE 101 from LTE control system 140 responsive to termination of the IMS media session. For example, if the IMS media session is terminated, such as a call ending while the phone is still attached to a WIFI network, the LTE gateway system 130 may transfer an instruction to the LTE control system 140 to remove the PCRF ID, PGW ID, UE ID, or other data stored in the LTE control system 140 that characterized the IMS media session for UE 101.

In a next operation, LTE control system 140 receives an LTE initial access message for UE 101. If the networking data characterizes the IMS media session over non-LTE communication network 110 through LTE gateway system 130, then LTE control system 140 transfers a session transfer message to LTE gateway system 130 to switch communication access for UE 101 from non-LTE communication network 110 to LTE communication network 120. This allows UE 101 to make connection with LTE communication network 120 before breaking connection with non-LTE communication network 110. This soft handoff allows UE 101 to switch from non-LTE communication network 110 to LTE communication network 120 without terminating the current IMS media session and forcing UE 101 to reattach to LTE communication network 120.

LTE control system 140 receives an LTE session termination message for UE 101. LTE control system 140 then transfers an LTE reattach message to LTE gateway system 130 to force UE 101 to reattach to LTE communication network 120. For example, once a phone call transferred from a WIFI network to an LTE communication network ends, LTE control system 140 may send LTE gateway system 130 an LTE reattach message to force the UE 101 to detach from LTE communication network 120 and reattach using the UE 101 LTE registration data.

In some examples, non-LTE communication network 110 may be a wireless fidelity network (WIFI) and gateway system 130 may be an ePDG. In some examples, networking data may be the RAT type, the ePDG ID, the IMS ID, the P-GW ID, or some other data that characterizes the IMS media session over the non-LTE communication network 110. For example, LTE gateway system 130 transfers the RAT type for entry into LTE control system 140 responsive to an IMS media session. In this example, LTE gateway system 130 would also transfer the instruction to remove the RAT type for entry into LTE control system 140 responsive to termination of the IMS media session.

In some examples, a P-GW transfers the networking data and the instruction to remove the networking data from an HSS. In other examples, LTE gateway system 130 transfers the RAT type for entry into an HSS. In other examples, a P-GW transfers the P-GW ID for entry into an HSS. In other examples, a P-GW transfers the ePDG ID for entry into an HSS.

Referring to FIG. 2, an LTE gateway system 130 exchanges (201) LTE registration data and IMS registration data with UE 101 over non-LTE communication network 110. LTE gateway system 130 transfers (202) networking data for UE 101 to LTE control system 140 responsive to an IMS media session for UE 101. LTE gateway system 130 transfers an instruction to remove the networking data for UE 101 from LTE control system 140 responsive to termination of the IMS media session. LTE control system 140 receives (203) an LTE initial access message for UE 101. If the networking data characterizes the IMS media session over non-LTE communication network 110 through LTE gateway system 130, then LTE control system 140 transfers (204) a session transfer message to LTE gateway system 130 to switch communication access for UE 101 from non-LTE communication network 110 to LTE communication network 120. LTE control system 140 receives (205) an LTE session termination message for UE 101. LTE control system 140 responsively transfers (206) an LTE reattach message to LTE gateway system 130 to force UE 101 to reattach to LTE communication network 120.

FIG. 3 illustrates the operation of LTE communication system 100 to transfer communications over LTE network 120 and non-LTE communication network 110. LTE gateway system 130 exchanges LTE registration data and IMS registration data with UE 101 over non-LTE communication network 110. In response to an IMS media session for UE 101, LTE gateway system 130 transfers networking data for UE 101 to LTE control system 140. Although not shown in FIG. 3, in response to termination of the IMS media session, LTE gateway system 130 transfers an instruction to remove the networking data for UE 101 from LTE control system 140. The networking data characterizes the IMS media session over non-LTE communication network 110 through LTE gateway system 130.

Still referring to FIG. 3, LTE control system 140 receives an LTE initial access message for UE 101. If the networking data characterizes the IMS media session over non-LTE communication network 110 through LTE gateway system 130, then LTE control system 140 transfers a session transfer message to LTE gateway system 130 to switch communication access for UE 101 from non-LTE communication network 110 to LTE communication network 120. LTE control system 140 then receives an LTE session termination message for UE 101. In response to receiving the LTE session termination message for UE 101, LTE control system 140 transfers an LTE reattach message to LTE gateway system 130 to force UE 101 to reattach to LTE access network 120.

Figure 4:
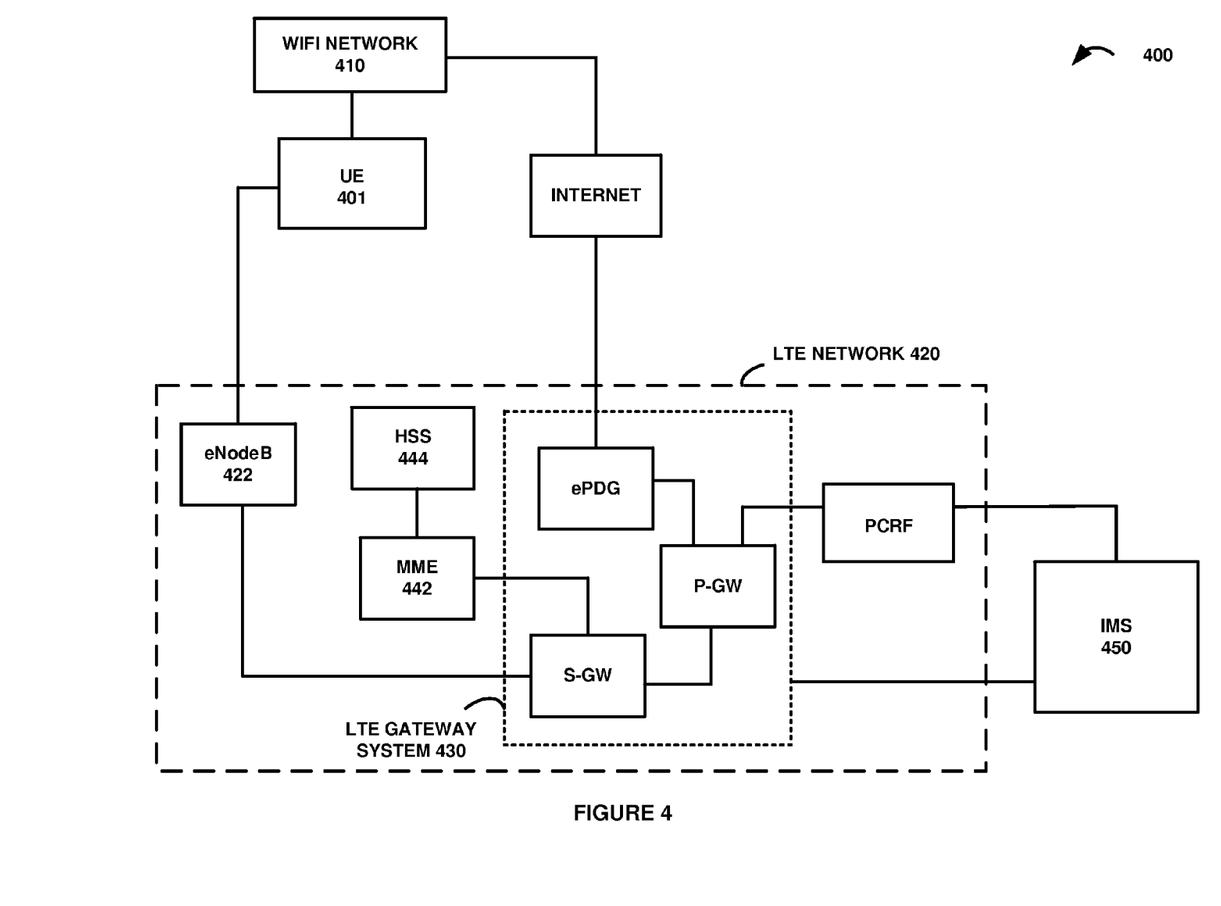
FIGS. 4-5 illustrate an LTE communication system to transfer communications from a Wireless Fidelity (WIFI) network to an LTE communication network.

FIG. 4 illustrates LTE communication system 400 to transfer communications over LTE communication network 420 and WIFI network 410. LTE communication system 400 is an example of LTE communication system 100, although LTE communication system 100 may use alternative configurations and operations. LTE communication system 400 comprises UE 401, WIFI network 410, Internet, LTE communication network 420, and IMS 450. LTE communication network 420 includes an eNodeB 422, MME 442, HSS 444, LTE gateway system 430, and PCRF. LTE gateway system 430 comprises S-GW, P-GW, and ePDG.

Figure 5:
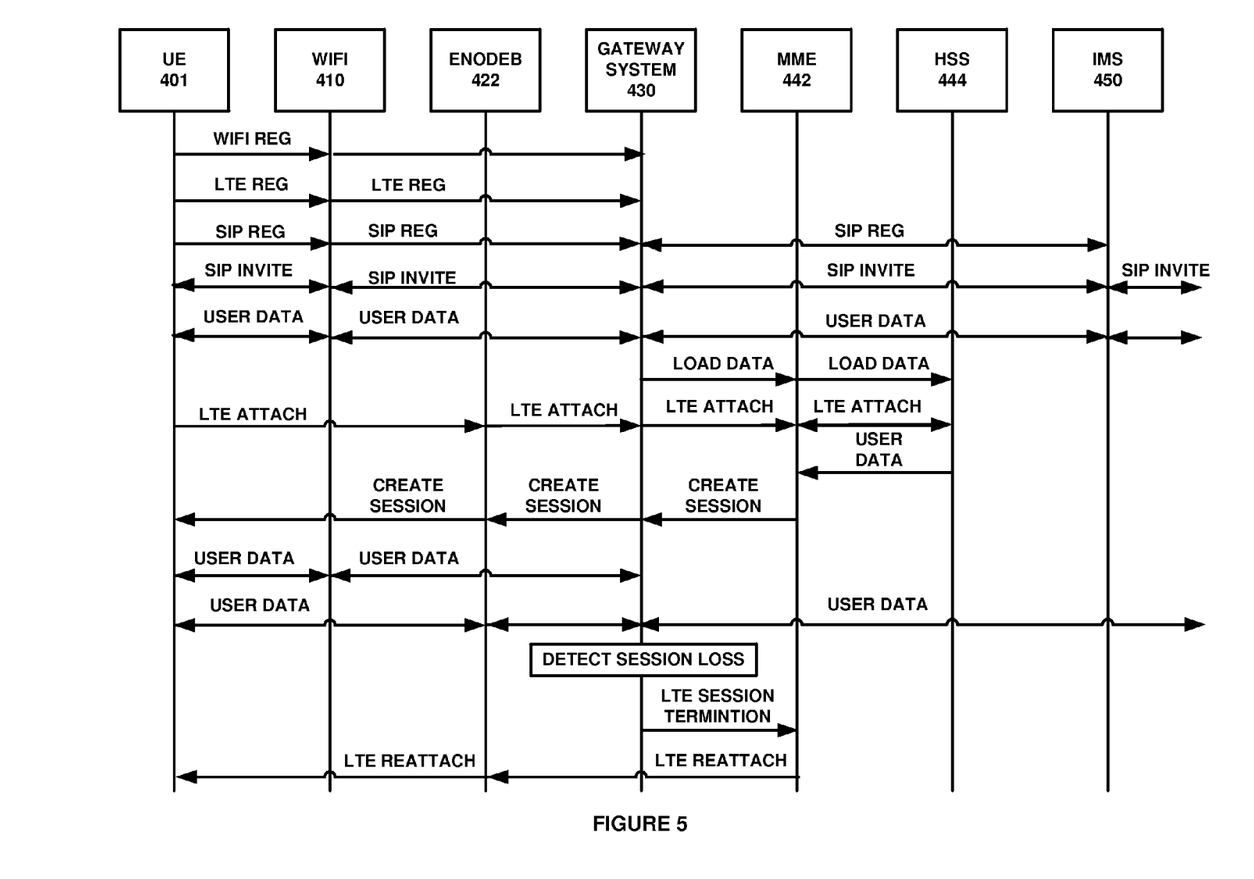

FIG. 5 illustrates an operation of LTE communication system 400 to transfer communications over LTE communication network 420 and WIFI network 410. UE 401 transfers the initial WIFI registration data, LTE registration data, and IMS registration data to LTE gateway system 430 over WIFI network 410. UE 401 then exchanges a Session Initiation Protocol (SIP) invite and user data to IMS 450 over WIFI network 410 through LTE gateway system 430. In this example embodiment, the user data characterizes the IMS media session over WIFI network 410 through LTE gateway system 430. User data could be the RAT type, ePDG ID, P-GW ID or some other IMS media session context information for UE 401.

Still referring to FIG. 5, in response to an IMS media session for UE 401, LTE gateway system 430 transfers the user data for UE 401 to MME 442. MME 442 then loads the user data into HSS 444. Unless the current IMS media session over WIFI network 410 is terminated, the user data will remain stored in HSS 444. In this example embodiment, the IMS media session is not terminated over WIFI network 410.

Still referring to FIG. 5, an LTE attach message for UE 401 is initiated and transferred from UE 401 to LTE gateway system 430 through eNodeB 422. In response to receiving the LTE attach message, LTE gateway system 430 transfers the LTE attach message to HSS 444 through MME 442. MME 442 then receives the user data characterizing the IMS media session over WIFI network 410 from HSS 444. MME 442 then transfers a create session message to LTE gateway system 430. In response to receiving the create session message, LTE gateway system 430 transfers the create session message to UE 401 through eNodeB 422. UE 401 then exchanges user data to setup the LTE connection through eNodeB 422. It should be noted that while UE 401 makes the LTE connection through eNodeB 422, UE 401 continues to exchange user data for the IMS media session with LTE gateway system 430 over WIFI network 410. Therefore, the UE 401 does not terminate connection with LTE gateway system 430 over WIFI network 410 until after the LTE connection over eNodeB 422 has been created.

Once the IMS media session has terminated, LTE gateway system 430 detects session loss and responsively transfers an LTE session termination message to MME 442. In response to receiving the LTE session termination message, MME 442 forces UE 401 to reattach to LTE network 420 by transferring an LTE reattach message to UE 401 through eNodeB 422.

Figure 6:
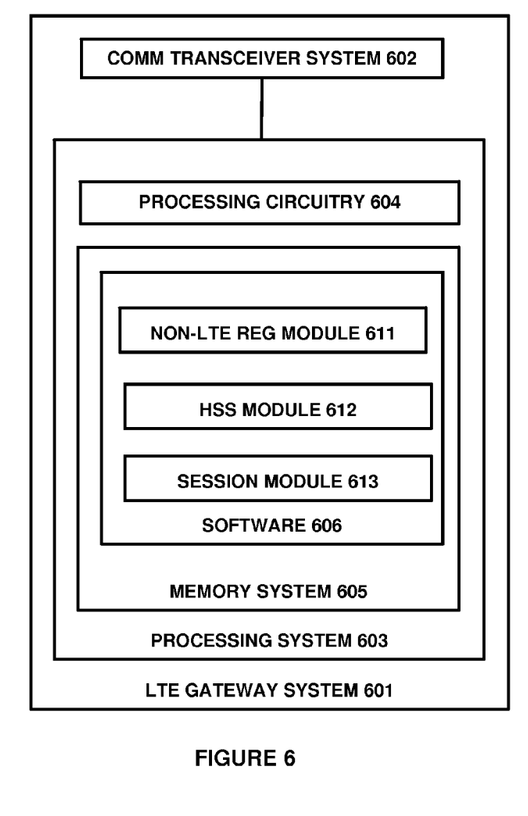
FIG. 6 illustrates an LTE gateway system to transfer communications from a non-LTE network to an LTE communication network.

FIG. 6 illustrates LTE gateway system 601. LTE gateway system 601 is an example of LTE gateway system 130 and LTE gateway system 430, although these systems may use alternative configurations and operations. LTE gateway system 601 comprises communication transceiver system 602 and processing system 603. Processing system 603 includes processing circuitry 604 and memory system 605 that stores software 606. Software 606 comprises software modules 611-613.

Communication transceiver system 602 comprises components that communicate over communication links such as network cards, ports, RF transceivers, processing circuitry and software, or some other communication components. Communication transceiver system 602 may be configured to use TDM, IP, Ethernet, optical networking, wireless protocols, communication signaling, or some other communication format—including combinations thereof. In particular, communication transceiver system 602 may interface with one of more LTE and non-LTE communication networks, IMS, and LTE control systems to transfer data and messages for a UE.

Processor circuitry 604 comprises microprocessor and other circuitry that retrieves and executes operating software 606 from memory system 605. Processor circuitry 604 may comprise a single device or could be distributed across multiple devices—including devices in different geographic areas. Processor circuitry 604 may be embedded in various types of equipment. Examples of processor circuitry 604 include central processing units, application specific processors, logic devices, and/or any type of computer processing devices—including combinations thereof. When executed by processing circuitry 604, software 606 directs processing system 603 to operate LTE gateway system 601 as described herein.

Memory system 605 comprises a non-transitory computer readable storage medium readable by processing system 604 and capable of storing software 606, such as a disk drive, flash drive, data storage circuitry, or some other hardware memory apparatus—including combinations thereof. Memory system 605 can include volatile and non-volatile, removable and non-removable media implemented in any method or technology for storage of information, such as computer readable instructions, data structures, program modules, or other data—including combinations thereof. Memory system 605 may comprise a single device or could be distributed across multiple devices—including devices in different geographic areas. Memory system 605 may be embedded in various types of equipment. In some examples, a computer apparatus could comprise memory system 605 and software 606.

Software 606 may be implemented in program instructions and may be executed by processing system 603. Software 606 comprises computer programs, firmware, or some other form of machine-readable processing instructions. Software 606 may include an operating system, utilities, drivers, network interfaces, applications, or some other type of software. In this example, software 606 comprises non-LTE registration module 611, HSS module 612, and session module 613, although software 606 could have alternative configurations in other examples. When executed by processing circuitry 604, software 606 directs processing system 603 to operate as described herein.

In particular, when executed by processing circuitry 604, non-LTE registration module 611 directs processing system 603 to exchange LTE registration data and IMS data with a UE over a non-LTE communication network. Non-LTE registration module 611 also directs processing system 603 to provide Internet Protocol (IP) and internet access. When executed by processing circuitry 604, HSS module 612 directs processing system 603 to transfer networking data for the UE to an LTE control system responsive to an IMS media session for the UE. When executed by processing circuitry 604, session module 613 directs processing system 603 to detect session loss and transfer an instruction to remove the networking data for the UE to the LTE control system responsive to termination of the IMS media session for the UE.

Figure 7:
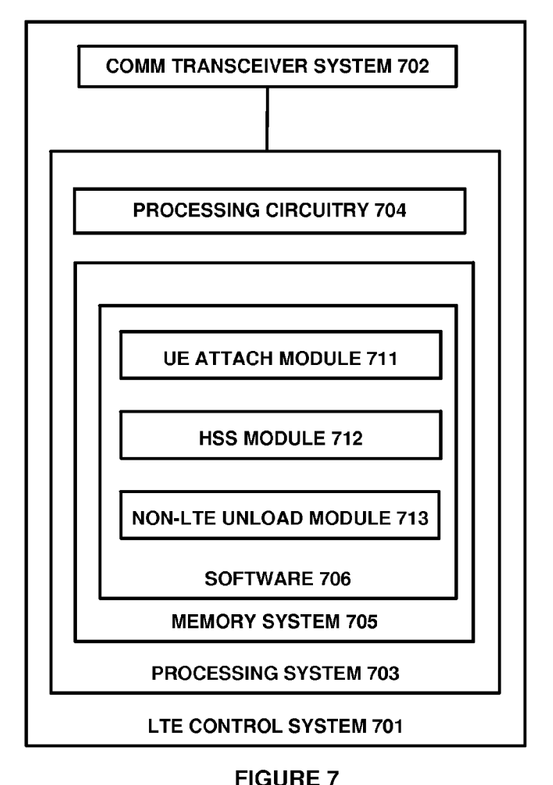
FIG. 7 illustrates an LTE control system to transfer communications from a non-LTE network to an LTE communication network.

FIG. 7 illustrates LTE control system 701. LTE control system 701 is an example of LTE control system 140 and HSS 444, although these systems may use alternative configurations and operations. LTE control system 701 comprises communication transceiver system 702 and processing system 703. Processing system 703 includes processing circuitry 704 and memory system 705 that stores software 706. Software 706 comprises software modules 711-713.

Communication transceiver system 702 comprises components that communicate over communication links such as network cards, ports, RF transceivers, processing circuitry and software, or some other communication components. Communication transceiver system 702 may be configured to use TDM, IP, Ethernet, optical networking, wireless protocols, communication signaling, or some other communication format—including combinations thereof. In particular, communication transceiver system 702 may interface with one of more LTE gateway systems to transfer data and messages for a UE.

Processor circuitry 704 comprises microprocessor and other circuitry that retrieves and executes operating software 706 from memory system 705. Processor circuitry 704 may comprise a single device or could be distributed across multiple devices—including devices in different geographic areas. Processor circuitry 704 may be embedded in various types of equipment. Examples of processor circuitry 704 include central processing units, application specific processors, logic devices, and/or any type of computer processing devices—including combinations thereof. When executed by processing circuitry 704, software 706 directs processing system 703 to operate LTE control system 701 as described herein.

Memory system 705 comprises a non-transitory computer readable storage medium readable by processing system 704 and capable of storing software 706, such as a disk drive, flash drive, data storage circuitry, or some other hardware memory apparatus—including combinations thereof. Memory system 705 can include volatile and non-volatile, removable and non-removable media implemented in any method or technology for storage of information, such as computer readable instructions, data structures, program modules, or other data—including combinations thereof. Memory device 705 may comprise a single device or could be distributed across multiple devices—including devices in different geographic areas. Memory system 705 may be embedded in various types of equipment. In some examples, a computer apparatus could comprise memory system 705 and software 706.

Software 706 may be implemented in program instructions and may be executed by processing system 703. Software 706 comprises computer programs, firmware, or some other form of machine-readable processing instructions. Software 706 may include an operating system, utilities, drivers, network interfaces, applications, or some other type of software. In this example, software 706 comprises UE attach module 711, HSS module 712, and non-LTE unload module 713, although software 706 could have alternative configurations in other examples. When executed by processing circuitry 704, software 706 directs processing system 703 to operate as described herein.

In particular, when executed by processing circuitry 704, UE attach module 711 directs processing system 703 to receive an LTE initial access message for a UE. When executed by processing circuitry 704, UE attach module 711 also directs processing system 703 to transfer an LTE reattach message to the LTE gateway system to force the UE to reattach to the LTE access network responsive to an LTE session termination message. When executed by processing circuitry 704, HSS module 712 directs processing system 703 to determine if the networking data stored in LTE control system 701 characterizes an IMS media session over a non-LTE communication network through an LTE gateway system. HSS module 712 then directs processing system 703 to transfer a session transfer message to the LTE gateway system to switch communication access for the UE from the non-TLE access network to the LTE access network. When executed by processing circuitry 704, non-LTE unload module 713 directs processing system 703 to receive an IMS session termination message or an LTE session termination message for a UE, and responsively unload the networking data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) communication network wherein an LTE gateway system exchanges LTE registration data and Internet Protocol (IP) Multimedia Subsystem (IMS) registration data with User Equipment (UE) over a non-LTE communication network, the method comprising:

the LTE gateway system transferring networking data for the UE to an LTE control system responsive to an IMS media session for the UE and transferring an instruction to remove the networking data for the UE from the LTE control system responsive to termination of the IMS media session, wherein the networking data characterizes the IMS media session over the non-LTE communication network through the LTE gateway system;

the LTE control system receiving an LTE initial access message for the UE and if the networking data characterizes the IMS media session over the non-LTE communication network through LTE gateway system, then transferring a session transfer message to the LTE gateway system to switch communication access for the UE from the non-LTE communication network to the LTE communication network and responsively detach from the non-LTE network; and the LTE control system receiving an LTE session termination message for the UE and responsively transferring an LTE reattach message to the LTE gateway system to force the UE to reattach to the LTE communication network.

2. The method of claim 1, wherein the non-LTE communication network comprises a wireless fidelity network and the LTE gateway system comprises an evolved Packet Data Gateway (ePDG).

3. The method of claim 1, wherein the LTE gateway system transferring the networking data and transferring the instruction to remove the networking data comprises the LTE gateway system transferring a Radio Access Technology (RAT) type for entry into the LTE control system and transferring an instruction to remove the RAT type from the LTE control system.

4. The method of claim 1, wherein the LTE gateway system transferring the networking data and transferring the instruction to remove the networking data comprises the LTE gateway system transferring an evolved Packet Data Gateway (ePDG) identifier (ID) for entry into the LTE control system and transferring an instruction to remove the ePDG ID from the LTE control system.

5. The method of claim 1, wherein the LTE gateway system transferring the networking data and transferring the instruction to remove the networking data comprises the LTE gateway system transferring an IMS identifier (ID) for entry into the LTE control system and transferring an instruction to remove the IMS ID from the LTE control system.

6. The method of claim 1, wherein the LTE gateway system transferring the networking data and transferring the instruction to remove the networking data comprises the LTE gateway system transferring a Packet Data Network Gateway (P-GW) identifier (ID) for entry into the LTE control system and transferring an instruction to remove the P-GW ID from the LTE control system.

7. The method of claim 1, wherein the LTE gateway system transferring the networking data and transferring the instruction to remove the networking data comprises a Packet Data Network Gateway (P-GW) transferring the networking data for entry into a Home Subscriber Server (HSS) and transferring the instruction to remove the networking data from the HSS.

8. The method of claim 1, wherein the LTE gateway system transferring the networking data and transferring the instruction to remove the networking data comprises the LTE gateway system transferring a Radio Access Type (RAT) type for entry into a Home Subscriber Server (HSS) and transferring the instruction to remove the networking data from the HSS.

9. The method of claim 1, wherein the LTE gateway system transferring the networking data and transferring the instruction to remove the networking data comprises a Packet Data Network Gateway (P-GW) transferring a P-GW identifier (ID) for entry into a Home Subscriber Server (HSS) and transferring an instruction to remove the P-GW ID from the HSS.

10. The method of claim 1, wherein the LTE gateway system transferring the networking data and transferring the instruction to remove the networking data comprises a Packet Data Network Gateway (P-GW) transferring the Evolved Packet Data Gateway (ePDG) identifier (ID) for entry into a Home Subscriber Server (HSS) and transferring the instruction to remove the ePDG ID from the HSS.

11. A Long-Term Evolution (LTE) communication network wherein an LTE gateway system exchanges LTE registration data and Internet Protocol (IP) Multimedia Subsystem (IMS) registration data with User Equipment (UE) over a non-LTE communication network, the network comprising:

the LTE gateway system configured to transfer networking data for the UE to an LTE control system responsive to an IMS media session for the UE and transfer an instruction to remove the networking data for the UE from the LTE control system responsive to termination of the IMS media session, wherein the networking data characterizes the IMS media session over the non-LTE communication network through the LTE gateway system;

the LTE control system configured to receive an LTE initial access message for the UE and if the networking data characterizes the IMS media session over the non-LTE network through LTE gateway system, then transfer a session transfer message to the LTE gateway system to switch communication access for the UE from the non-LTE access network to the LTE access network and responsively detach from the non-LTE network; and the LTE control system configured to receive an LTE session termination message for the UE and responsively transfer an LTE reattach message to the LTE gateway system to force the UE to reattach to the LTE access network.

12. The LTE communication network of claim 11 wherein the non-LTE communication network comprises a wireless fidelity network and the LTE gateway system comprises an evolved Packet Data Gateway (ePDG).

13. The LTE communication network of claim 11 wherein the LTE gateway system is configured to transfer a Radio Access Technology (RAT) type for entry into the LTE control system and transfer an instruction to remove the RAT type from the LTE control system.

14. The LTE communication network of claim 11 wherein the LTE gateway system is configured to transfer an evolved Packet Data Gateway (ePDG) identifier (ID) for entry into the LTE control system and transfer an instruction to remove the ePDG ID from the LTE control system.

15. The LTE communication network of claim 11 wherein the LTE gateway system is configured to transfer an IMS identifier (ID) for entry into the LTE control system and transfer an instruction to remove the IMS ID from the LTE control system.

16. The LTE communication network of claim 11 wherein the LTE gateway system is configured to transfer a Packet Data Network Gateway (P-GW) identifier (ID) for entry into the LTE control system and transfer an instruction to remove the P-GW ID from the LTE control system.

17. The LTE communication network of claim 11 wherein the LTE gateway system configured to transfer the networking data and transfer the instruction to remove the networking data comprises a Packet Data Network Gateway (P-GW) configured to transfer the networking data for entry into a Home Subscriber Server (HSS) and transfer the instruction to remove the networking data from the HSS.

18. The LTE communication network of claim 11 wherein the LTE gateway system is configured to transfer a Radio Access Type (RAT) type for entry into a Home Subscriber Server (HSS) and transfer the instruction to remove the networking data from the HSS.

19. The LTE communication network of claim 11 wherein the LTE gateway system configured to transfer the networking data and transfer the instruction to remove the networking data comprises a Packet Data Network Gateway (P-GW) configured to transfer a P-GW identifier (ID) for entry into a Home Subscriber Server (HSS) and transfer an instruction to remove the P-GW ID from the HSS.

20. The LTE communication network of claim 11 wherein the LTE gateway system configured to transfer the networking data and transfer the instruction to remove the networking data comprises a Packet Data Network Gateway (P-GW) configured to transfer an Evolved Packet Data Gateway (ePDG) identifier (ID) for entry into a Home Subscriber Server (HSS) and transferring an instruction to remove the ePDG ID from the HSS.

* * * * *